United States Patent [19]
Wisskirchen et al.

[11] Patent Number: 5,497,135
[45] Date of Patent: Mar. 5, 1996

[54] BISTABLE ELECTROMAGNET, PARTICULARLY AN ELECTROMAGNETIC VALVE

[75] Inventors: Michael Wisskirchen, Neukirch; Bernd Geser, Wasserburg, both of Germany

[73] Assignee: Harald Schrott, Lindau, Germany

[21] Appl. No.: 347,314

[22] PCT Filed: Mar. 30, 1994

[86] PCT No.: PCT/DE94/00358

§ 371 Date: Nov. 30, 1994

§ 102(e) Date: Nov. 30, 1994

[87] PCT Pub. No.: WO94/23435

PCT Pub. Date: Oct. 13, 1994

[30] Foreign Application Priority Data

Mar. 31, 1993 [DE] Germany .............. 43 10 415.0
Sep. 28, 1993 [DE] Germany .............. 43 32 960.8

[51] Int. Cl.⁶ .................................................. H01F 7/08
[52] U.S. Cl. ..................... 335/253; 335/229; 335/234
[58] Field of Search .......................... 335/170, 229–234, 335/238, 239, 253, 254; 251/129.02

[56] References Cited

U.S. PATENT DOCUMENTS

| | | |
|---|---|---|
| 3,755,766 | 8/1973 | Read, Jr. . |
| 3,775,714 | 11/1973 | Heuer . |
| 4,306,207 | 12/1981 | Tada et al. ............... 335/234 |
| 4,383,234 | 5/1983 | Yatsushiro et al. . |
| 4,422,060 | 12/1983 | Matsumoto et al. . |
| 4,628,289 | 12/1986 | Huber ...................... 335/168 |
| 4,829,947 | 5/1989 | Lequesne ............... 123/90.11 |
| 5,170,144 | 12/1992 | Nielsen . |

FOREIGN PATENT DOCUMENTS

| | | |
|---|---|---|
| 0219572 | 4/1987 | European Pat. Off. . |
| 0380693 | 8/1990 | European Pat. Off. . |
| 1166369 | 3/1964 | Germany . |
| 1282402 | 11/1968 | Germany . |
| 1550378 | 9/1971 | Germany . |
| 8619497 | 11/1986 | Germany . |
| 8900779 | 6/1989 | Germany . |
| 3939537 | 6/1991 | Germany . |
| 4124087 | 1/1993 | Germany . |

OTHER PUBLICATIONS

Patent Abstracts of Japan, vol. 4, No. 75 (E–13) (557), May 31, 1980 & JP-A-55-43867, Mar. 27, 1980.

*Primary Examiner*—Leo P. Picard
*Assistant Examiner*—Raymond M. Barrera
*Attorney, Agent, or Firm*—Spencer & Frank

[57] ABSTRACT

A bistable electromagnet is moved from one operating position into the other by a short direct-current pulse, the next pulse following in each case having the opposite current direction. The essential factor in this is a permanent magnet which is arranged in the core area and which holds the armature against the action of an armature spring in one operating position. An electromagnet constructed in this manner can be produced without tolerance calibration and requires less control power when the permanent magnet is carried freely movably between two end positions in the direction of armature movement in a hollow space of the coil core. The coil core can be constructed as a pot, at the bottom of which the permanent magnet is magnetically held whilst the permanent magnet is held in the other end position by a stop in such a manner that its side facing the armature is approximately flush with the edge of the pot.

18 Claims, 1 Drawing Sheet

BISTABLE ELECTROMAGNET, PARTICULARLY AN ELECTROMAGNETIC VALVE

BACKGROUND OF THE INVENTION

The invention relates to a bistable electromagnet, particularly an electromagnetic valve which is actuated by an electromagnet having a yoke. A coil is connected to the yoke. The coil has an interior region. An element is located within the interior region of the coil and defines a hollow space therein. An armature is provided that is movable between two operating positions. A spring acts upon the armature. A permanent magnet is arranged in the hollow space of the element and holds the armature against a force of the spring in one of the operating positions. An electromagnet of this type usually has a cylindrical coil and is frequently called a plunger-type magnet. The yoke can contain a hollow cylinder surrounding the coil or consist of a flat material bent in a U-shape.

A known bistable electromagnet is described in European Patent Application 0 219 572. It actuates a vacuum valve and is distinguished by the fact that the entire coil core is constructed as a permanent magnet and is stationarily associated with the armature. The armature plunges into the coil by means of a positive direct-current pulse and is held in this attracted operated position by the permanent magnet in opposition to the spring force. A negative direct-current pulse weakens the holding force of the permanent magnet to such a degree that the spring force predominates and the armature goes into the released operating position.

However, the holding force of the permanent magnet is very sensitive to tolerance in the attracted operating position, that is to say the unavoidable production tolerances of the permanent magnet and the other components make an individual mechanical adjustment or adjustment of the period or amplitude of the control pulse unavoidable in series production. A further disadvantage of the known magnet consists in that the release pulse must be long enough for the armature to be no longer within the range of influence of the permanent magnet. The control power is therefore undesirably high in spite of the basically economic operation.

SUMMARY OF THE INVENTION

The invention is based on the object of developing a bistable electromagnet of the type described in such a manner that it can be produced without tolerance calibration and requires less control power.

According to the invention, this object is achieved by providing a permanent magnet that is freely movable between two end positions in the hollow space within the element. Additionally, the magnet is movable in a direction of movement of the armature. Accordingly, the permanent magnet has two end positions with respect to the stationary magnetic system, namely one which is closer to the armature and one which is more distant from the armature. In the operating position with attracted armature, the permanent magnet assumes the end position close to the armature and holds it against the spring force. During the release pulse, in contrast, it is not only the holding force of the permanent magnet which is weakened but, at the same time, it is moved away from the armature into its other end position. This eliminates its influence on the release process and distinctly reduces the sensitivity of the system to tolerance. The control pulse can end when the permanent magnet has reached its remote end position. This shortening of the time of current application results in a further reduction of the control power consumption.

To create the required hollow space in the coil core, it is preferably constructed as a pot, at the bottom of which the permanent magnet magnetically is held in the remote end position whilst the permanent magnet is held in the other end position by a stop in such a manner that its side facing the armature is approximately flush with the edge of the pot. The stop can be a magnetically non conductive transverse wall in the interior space of the coil, which extends between the permanent magnet and the armature. In a preferred application of the electromagnet as an electromagnetic valve, this transverse wall is the end wall of a guide bush in which the armature is moving and which tightly encloses a, for example, liquid medium which is to be blocked by the valve.

To ensure easy mobility of the permanent magnet, it is also proposed that a magnetically non-conductive guide cage encompassing the permanent magnet is provided which is provided on its outer surface with longitudinal grooves and is attached in the pot-shaped coil core or at the permanent magnet. For example, this guide cage could be a lining consisting of plastic in the hollow space of the coil core. A pot of stainless steel, in which the permanent magnet is embedded and permanently bonded, in particular, by means of an adhesive, has been found to be particularly suitable.

BRIEF DESCRIPTION OF THE DRAWINGS

An illustrative embodiment of the invention is explained with reference to the drawing, in which, in detail.

DETAILED DESCRIPTION OF THE INVENTION

Figure 1:
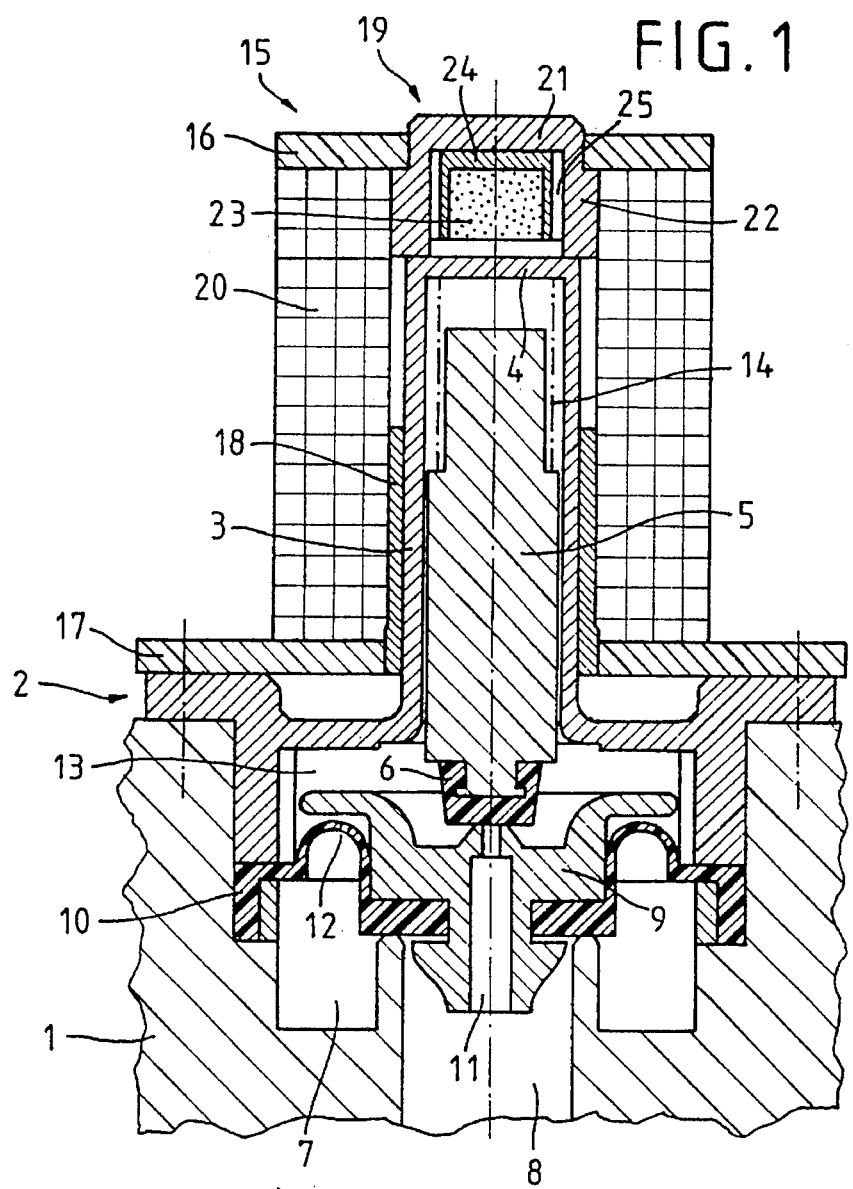
FIG. 1 shows a longitudinal section of a bistable electromagnet, constructed as a servovalve, in the released operating position with the valve closed.

The valve according to FIG. 1 has a housing structure 1, only shown in section, and a cover 2, in each case of plastic. The cover has an upwardly protruding guide bush 3 which is closed off at the top by an end wall 4. In the guide bush, a cylindrical armature 5 moves which exhibits at the lower end a sealing body 6. Between an inlet duct, not shown, opening into an annular space 7 and an outlet duct 8, the main valve seat is located. It is closed by the center part of a diaphragm seal 10 by means of a valve disk 9. The valve disk 9 has a central hole 11, the upper end of which forms a servovalve seat and interacts with the sealing body 6 of the armature. The diaphragm seal 10 has a small passage opening 12 which allows a pressure equalizing between the annular space 7 and the control pressure chamber 13 closed off by the diaphragm seal 10.

The armature 5 is under the action of a compression spring 14 which, on the one hand, is supported against a shoulder of the armature and, on the other hand, against the end wall 4 and presses the sealing body 6 onto the servovalve seat of the valve disk 9 in the position according to FIG. 1.

Onto the valve described, an electromagnet is placed which exhibits a yoke 15 of a flat material of soft iron bent in a U shape. It has an upper leg 16 and a lower leg 17 which, at the same time, is used for attachment to the housing structure of the valve. In the lower leg 17, a pole tube 18 is inserted and into the upper leg 16, an element 19 is inserted. Both have the same outside diameter and are surrounded by a coil 20 shown diagrammatically. Thus, element 19 is located in a center of coil 20. The pole tube 18 is in close contact around the guide bush 3 of the valve-housing cover.

The element 19 has the shape of a cap or of a pot with a bottom 21 and a cylindrical wall 22 which is smooth on the inside and is provided with a shoulder on the outside. The element 19 is inserted into the upper yoke leg 16 with the upper part of smaller outside diameter, the bottom 21 being located approximately at the level of this leg whilst the edge of the wall 22, that is to say the lower face end of the pot rests on the transverse wall 4 of the guide bush.

In the hollow space thus formed, a cylindrical permanent magnet 23 is located which is bonded into a stainless steel pot 24. Stainless steel pot 24 acts as a guide cage for permanent magnet 23. The opening of this pot, too, points downward toward the armature 5. The outside wall of the stainless steel pot 24 is provided with longitudinal grooves 25 in order to provide for unimpeded air equalizing during the fast movement of the permanent magnet. The stainless steel pot has sufficient play in the element 19 so that it can move up and down unimpeded with the permanent magnet between an end position remote from the armature in which the bottom of the stainless steel pot rests against the bottom 21 of the core, and an end position close to the armature in which the permanent magnet 23 and its edge-flush stainless steel pot rest on the transverse wall 4.

Figure 2:
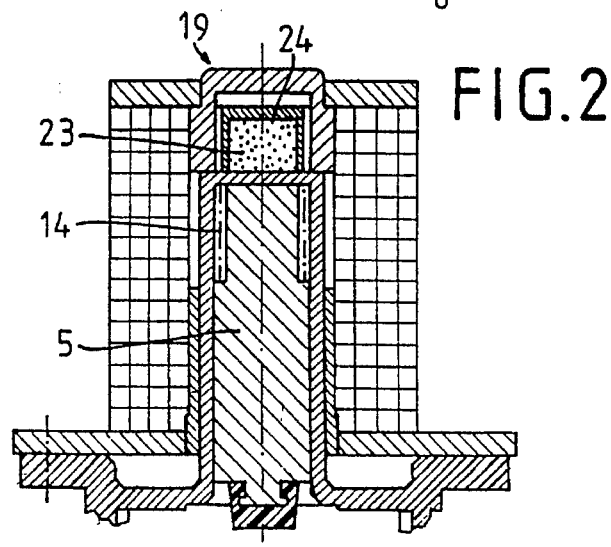
FIG. 2 shows a section of FIG. 1 at a reduced scale, the armature being located in the attracted operating position and the valve being open.

In the release position of the armature 5 shown in FIG. 1, the permanent magnet 23 assumes its top end position in which it is held by its magnetic forces against the bottom 21 of the core. If then a direct-current pulse is applied to the coil 20, which is polarized in such a manner that the magnetic flux produced weakens the field of the permanent magnet, the permanent magnet is repelled from its rest area at the bottom 21. At the same time, the armature 5 is attracted in the direction of the core. Due to the permanent magnet 23, the armature 5 remains in this attracted operating position shown in FIG. 2. The sealing body 6 is lifted away from its servovalve so that the valve can open.

When an oppositely polarized direct-voltage pulse is applied, the permanent magnet is attracted to its original rest area. As a result, the armature 5, supported by its compression spring 14, can no longer stay in this position and moves back into the operating position according to FIG. 1 away from the element 19.

The invention reduces the sensitivity of the magnetic system to tolerance distinctly and by such an amount that a mass production of such magnets or valves can be carried out in an economic manner without individual adjustment. The further power saving achieved is of the utmost importance when it is, for example, a matter of operating valves installed in sanitary fittings without line connection from small batteries.

We claim:

1. A bistable electromagnet, comprising:

a yoke;

a coil connected to said yoke and having a interior region;

an element located within the interior region of said coil and defining a hollow space therein;

an armature at least partially located within the interior region of said coil and being movable between two operating positions;

a spring acting upon said armature; and a permanent magnet arranged in the hollow space of said element and holding said armature against a force of said spring in one of the operating positions, said permanent magnet being freely movable between two end positions in the hollow space in a direction of movement of said armature.

2. The bistable electromagnet defined in claim 1, wherein said element comprises a pot having a bottom, said magnet being magnetically held to the bottom in one of the two end positions, and being held in the other of the two end positions by a stop so that a side of said magnet facing said armature is approximately flush with an edge of said pot.

3. The bistable electromagnet defined in claim 2, further comprising a magnetically non-conductible guide cage encompassing said permanent magnet and having an outer surface including longitudinal grooves, said guide cage being attached in said pot.

4. The bistable electromagnet defined in claim 3, wherein said guide cage comprises stainless steel.

5. The bistable electromagnet defined in claim 3, wherein said guide cage comprises a plastic lining.

6. The bistable electromagnet defined in claim 2, further comprising a magnetically non-conductible guide cage encompassing said permanent magnet and having an outer surface including longitudinal grooves, said guide cage being attached to said permanent magnet.

7. The bistable electromagnet defined in claim 6, wherein said guide cage comprises stainless steel.

8. The bistable electromagnet defined in claim 6, wherein said permanent magnet is bonded in said guide cage.

9. A bistable electromagnetic valve, comprising:

a yoke;

a coil connected to said yoke and having a interior region;

an element located within the interior region of said coil and defining a hollow space therein;

an armature at least partially located within the interior region of said coil and being movable between two operating positions;

a spring acting upon said armature; and a permanent magnet arranged in the hollow space of said element and holding said armature against a force of said spring in one of the operating positions, said permanent magnet being freely movable between two end positions in the hollow space in a direction of movement of said armature, and freely movable with respect to said armature.

10. A bistable electromagnet, comprising:

a yoke;

a coil connected to said yoke and having a interior region;

an element located within the interior region of said coil and defining a hollow space therein;

an armature at least partially located within the interior region of said coil and being movable between two operating positions a spring acting upon said armature; and a permanent magnet arranged in the hollow space of said element and holding said armature against a force of said spring in one of the operating positions, said permanent magnet being freely movably guided with respect to said armature between two end positions in the hollow space, one of the end positions being a holding position for holding said armature, and the other of the end positions being a release position for releasing said armature.

11. The bistable electromagnet defined in claim 10, wherein said permanent magnet is displaceable in a direction of said armature into the holding position, and in a direction away from said armature into the release position.

12. The bistable electromagnet defined in claim 10, wherein said element comprises a pot having a bottom, said magnet being magnetically held to the bottom in one of the two end positions, and being held in the other of the two end positions by a stop so that a side of said magnet facing said armature is approximately flush with an edge of said pot.

13. The bistable electromagnet defined in claim 12, further comprising a magnetically non-conductible guide cage encompassing said permanent magnet and having an outer surface including longitudinal grooves, said guide cage being attached in said pot.

14. The bistable electromagnet defined in claim 13, wherein said guide cage comprises stainless steel.

15. The bistable electromagnet defined in claim 13, wherein said guide cage comprises a plastic lining.

16. The bistable electromagnet defined in claim 12, further comprising a magnetically non-conductible guide cage encompassing said permanent magnet and having an outer surface including longitudinal grooves, said guide cage being attached to said permanent magnet.

17. The bistable electromagnet defined in claim 16, wherein said guide cage comprises stainless steel.

18. The bistable electromagnet defined in claim 16, wherein said permanent magnet is bonded in said guide cage.

* * * * *